8224X
J. Wheaton,
Grinding Metal Surfaces.
Patented May 28, 1834.
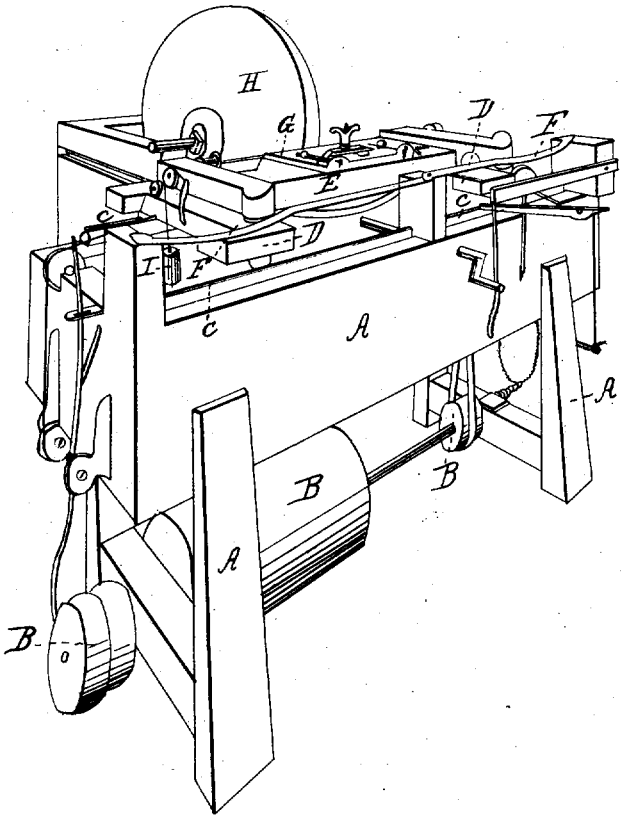
N. PETERS, PHOTO-LITHOGRAPHER, WASHINGTON, D. C.

James Wheaton Providence Rhode Island
Letters Patent

The Schedule referred to in these Letters Patent and making part of the same,
containing a description in the words of the said James Wheaton himself
of his Improvement called the Eliptical Spindle Grinder (Specification and Description of the Eliptical Spindle Grinder being an Improvement
on the Spindle Grinder in Common use, and which may be used for grinding various
things besides Spindles.)

Be it known and remembered that I James Wheaton
Machinist at Providence in the County of Providence and State of Rhode Island
have invented a new and useful Improvement on the spindle Grinder called
by me, the Eliptical Spindle Grinder which can also be used for grinding other
articles besides Spindles the Construction operation and advantages of which may
be thus Specified and described To Wit —

In the drawing hereto annexed AAA
represent the frame of the machine B.B.B. denote a common shaft from
which motion is communicated to the Carriage & the [illegible] thing to be ground
C.C.C. rail way a Slide on the top of the frame, on which the Carriage DD
traverses. This Carriage is made of iron or other hard Metal and traverses back
and forward on the railway or Slide, the length of the Spindle or other thing
to be ground so as to present every part of it in succession to the Grindstone.
This motion of the Carriage together with the rotary motion of the Spindle
or thing to be ground [illegible] machinery is derived from the drum B.B.B.
by means of belts endless screws and cog wheels, Neither these parts of the
+ machine nor their relative positions nor their operation vary from the
same part of the machine called the Spindle Grinder now in use
On the top of the Carriage is the Lathe that holds the Spindle or thing to
be ground, This is also in the old machine but its mode of connexion
with the Carriage is [illegible] new as well as the method of grinding Drawing it is it moved in the Carriage from the Centre of the Carriage, or about the
Centre, lengthwise and near the edge of it, next the grindstone cylinder
is fixed a stud or pivot which is fast in the Carriage but moves easily in
a Slot in the Lathe. The Lathe might be turned entirely around on this
pivot but for other parts of the machine, its object is to permit it to be partly
turned as it moves on the carriage and at the same time to give it the
same motion forward and back that the carriage has. In the old
Machine the Lathe has the same motion forward and back as the
Carriage and also a motion from side to side. The same effect may
also be produced by connecting the Lathe to it the Carriage by means
of wheels or pullies made fast to the one and moving in grooves made
to the other, but this mode of connexion though not a [illegible] is inferior
to the one first described.

On the top of the side of the frame most remote from
the Grindstone are placed some stands extending upward as high as the
lathe. Attached to these is the track of the lathe PP. against this track the
lathe passes in its passage backward and forward on the carriage, the stud or
pivot which forms its connexion with the carriage permitting it always to
keep against it although it is not in a right line with the side of the lathe
The same result can be attained by having the track under or over or on
the other side of the lathe but not so conveniently. This is also claimed as new.
The friction of the lathe against the track and also on the carriage is
diminished by the use of friction pullies. The lathe is kept steady and
pressed against the track by means of two friction straps and weights
one of which is fastened to each end of the carriage [illegible]. The strap
passing up over a pulley on the lathe from which the weight is suspended.
One of these is seen in the drawing and is marked L.

On the top of the lathe and attached to it
by a screw bolt passing through a slot is the spindle seat I made of hard
or other stiff metal. The thickness of the seat is equal to the diameter
of the thing to be ground and its length depends upon the length of the
thing to be ground. Against the side of this seat towards the Grindstone
the spindle or thing to be ground presses and rests. By means of two screws passing through a Shoulder on the other side of this rest and playing
with two Stands passing through it near the other sides the Stands moving
in Slots in the rest, the rest itself is moved towards the grindstone
as it is worn away by use. The Shape size and materials of this rest
are claimed as new.

A. The Spindle or thing to be ground is held at each
end by a Spring Centre on which it turns, Motion being Communi-
cated to it by a belt from the Drum B.B.B.

I.I the Grindstone turns in an iron Carriage on a
frame extending back at right angles from the frame first described
This Carriage with the Stone in it can be moved on its frame to and
from the Spindle or thing to be ground by a Screw in front of the first
described frame. The friction here is diminished by the use of wheels or
friction pulleys under the Carriage. The position of the Grindstone and the
manner in which it is moved with its carriage and turned are the
same as in the old Machine. The back of the lathe N.N. aforedescribed
is made of iron or other hard metal and its Shape is varied according
to the Shape of the Spindle or thing to be ground.

In operating a Machine with this
Improvement a rest is made corresponding in length and thickness
with the length and diameter of the thing to be ground and is affixed
to the lathe as aforedescribed. A lathe back of proper shape is affixed
to the Stand on the frame, the Spindle or thing to be ground is then
fixed on its centres in back of the rest pressing against it, Motion
being communicated to the Drum a rapid rotary motion is given
to the Spindle or thing to be ground and the Lathe traverses back
and forward on its carriage the front part of it being kept against
the lathe back by means of the weights aforedescribed and the
pressure of the grindstone against the thing which is being ground
Motion being at the same time Communicated to the Grindstone
and the Grindstone by means of the Screw being drawn and held
against the Spindle or thing to be ground as it passes the lathe
the required shape is given to the Spindle or thing to be ground.

The advantages resulting from this improvement are that the [illegible] [illegible] thing ground, with the same track of the Lathe are uniform in shape and size and the labour is performed with much less expense than by the ordinary method.

What I claim as my invention is the connection between the lathe & carriage by means of the pivot or stud placed and used as aforedescribed by which each end of the lathe is left free to move to or from the Grindstone and the whole lathe is permitted to vibrate the length of the Slot in which the stud or pivot is inserted — — —

Also the track so called which guides the lathe being of such form as to press the spindle or thing to be ground against the face of the grindstone in such manner as to produce the shape desired in the thing to be ground and also the use of weights to assist in keeping the lathe against said track and in keeping the lathe steady and the rest aforedescribed.

James Wheaton

Witness
Philip W. Martin
William R. Staples

1650 [illegible]

Drawing